(12) United States Patent
Vincent et al.

(10) Patent No.: US 11,555,451 B2
(45) Date of Patent: Jan. 17, 2023

(54) CERAMIC ARTICLE WITH THERMAL INSULATION BUSHING

(71) Applicant: RAYTHEON TECHNOLOGIES CORPORATION, Farmington, CT (US)

(72) Inventors: Tyler G. Vincent, Portland, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 54 days.

(21) Appl. No.: 17/101,247

(22) Filed: Nov. 23, 2020

(65) Prior Publication Data

US 2022/0162988 A1    May 26, 2022

(51) Int. Cl.
*F02C 7/24* (2006.01)

(52) U.S. Cl.
CPC ........ *F02C 7/24* (2013.01); *F05D 2300/6033* (2013.01)

(58) Field of Classification Search
None
See application file for complete search history.

(56) References Cited

U.S. PATENT DOCUMENTS

| 6,648,597 | B1* | 11/2003 | Widrig | F01D 9/044 |
| | | | | 415/200 |
| 6,670,021 | B2 | 12/2003 | Schroder et al. | |
| 2014/0271147 | A1* | 9/2014 | Uskert | F01D 11/22 |
| | | | | 415/173.2 |
| 2016/0348526 | A1* | 12/2016 | Vetters | F01D 25/246 |
| 2017/0167296 | A1 | 6/2017 | Renggli | |
| 2019/0203611 | A1 | 7/2019 | Stieg et al. | |
| 2020/0191007 | A1* | 6/2020 | Barker | F01D 25/246 |

FOREIGN PATENT DOCUMENTS

| EP | 2871331 | 5/2015 |
| EP | 2927597 | 10/2015 |
| EP | 3584412 | 12/2019 |
| EP | 3587740 | 1/2020 |
| EP | 3620618 | 3/2020 |
| EP | 3643878 | 4/2020 |

OTHER PUBLICATIONS

European Search Report for European Patent Application No. 21209362.9 dated May 3, 2022.

* cited by examiner

*Primary Examiner* — Katheryn A Malatek
(74) *Attorney, Agent, or Firm* — Carlson, Gaskey & Olds, P.C.

(57) ABSTRACT

A gas turbine engine article includes a ceramic body that defines a flange, first and second cooling passages partitioned from each other by the flange, a through-hole in the rib that connects the first and second cooling passages, a thermal insulation bushing that lines the through-hole.

14 Claims, 6 Drawing Sheets

CERAMIC ARTICLE WITH THERMAL INSULATION BUSHING

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine article according to an example of the present disclosure includes a ceramic body that defines a flange, first and second cooling passages partitioned from each other by the flange, a through-hole in the flange that connects the first and second cooling passages, and a thermal insulation bushing that lines the through-hole.

In a further embodiment of any of the foregoing embodiments, the thermal insulation bushing is a spool that has first and second opposed flanges with a tube extending there between.

In a further embodiment of any of the foregoing embodiments, the tube is cylindrical.

In a further embodiment of any of the foregoing embodiments, the tube has a polygonal cross-section.

In a further embodiment of any of the foregoing embodiments, the tube defines an outer surface and the through-hole defines holes sides, and there is a gap between the outer surface and the hole sides.

A further embodiment of any of the foregoing embodiments includes a thermal insulation sleeve in the gap.

In a further embodiment of any of the foregoing embodiments, the tube is in non-contact with the ceramic body.

In a further embodiment of any of the foregoing embodiments, the first and second flanges contact the ceramic body.

In a further embodiment of any of the foregoing embodiments, the thermal insulation bushing has foldable tabs.

In a further embodiment of any of the foregoing embodiments, the thermal insulation bushing is metallic.

In a further embodiment of any of the foregoing embodiments, the thermal insulation bushing is ceramic.

In a further embodiment of any of the foregoing embodiments, the thermal insulation bushing is a single-ended spool having a single flange and a tube extending therefrom.

A gas turbine engine article according to an example of the present disclosure includes a ceramic matrix composite airfoil body that defines first and second platforms and an airfoil section extending between the first and second platforms. The first platform defines a radially inner side, a radially outer side, and a flange that projects from the radially outer side. First and second cooling passages are partitioned from each other by the flange. A through-hole in the flange connects the first and second cooling passages. A thermal insulation bushing lines the through-hole.

In a further embodiment of any of the foregoing embodiments, the thermal insulation bushing is a spool that has first and second opposed flanges with a tube extending there between.

In a further embodiment of any of the foregoing embodiments, the tube defines an outer surface and the through-hole defines holes sides, there is a gap between the outer surface and the hole sides, and the first and second flanges contact the ceramic body.

In a further embodiment of any of the foregoing embodiments, the thermal insulation bushing is a single-ended spool having a single flange and a tube extending therefrom.

A gas turbine engine according to an example of the present disclosure includes a compressor section, a combustor in fluid communication with the compressor section, and a turbine section in fluid communication with the combustor. The turbine section has vanes disposed about a central axis of the gas turbine engine. Each of the vanes includes a ceramic matrix composite airfoil body that defines first and second platforms and an airfoil section that extends between the first and second platforms. The first platform defines a radially inner side, a radially outer side, and a flange that projects from the radially outer side. First and second cooling passages are partitioned from each other by the flange. The compressor section provides cooling air to the first cooling passage that is at a first pressure and to the second cooling passage that is at a second, different pressure. A through-hole in the flange connects the first and second cooling passages. The cooling air flows through the through-hole. A bushing lines the through-hole and thermally insulates the flange from being cooled by the cooling air flowing through the through-hole.

In a further embodiment of any of the foregoing embodiments, the thermal insulation bushing is a metallic spool that has first and second opposed flanges with a tube extending there between, the tube defines an outer surface and the through-hole defines holes sides, and there is a gap between the outer surface and the hole sides.

In a further embodiment of any of the foregoing embodiments, the first and second flanges contact the ceramic body.

In a further embodiment of any of the foregoing embodiments, the thermal insulation bushing is a single-ended spool having a single flange and a tube extending therefrom.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
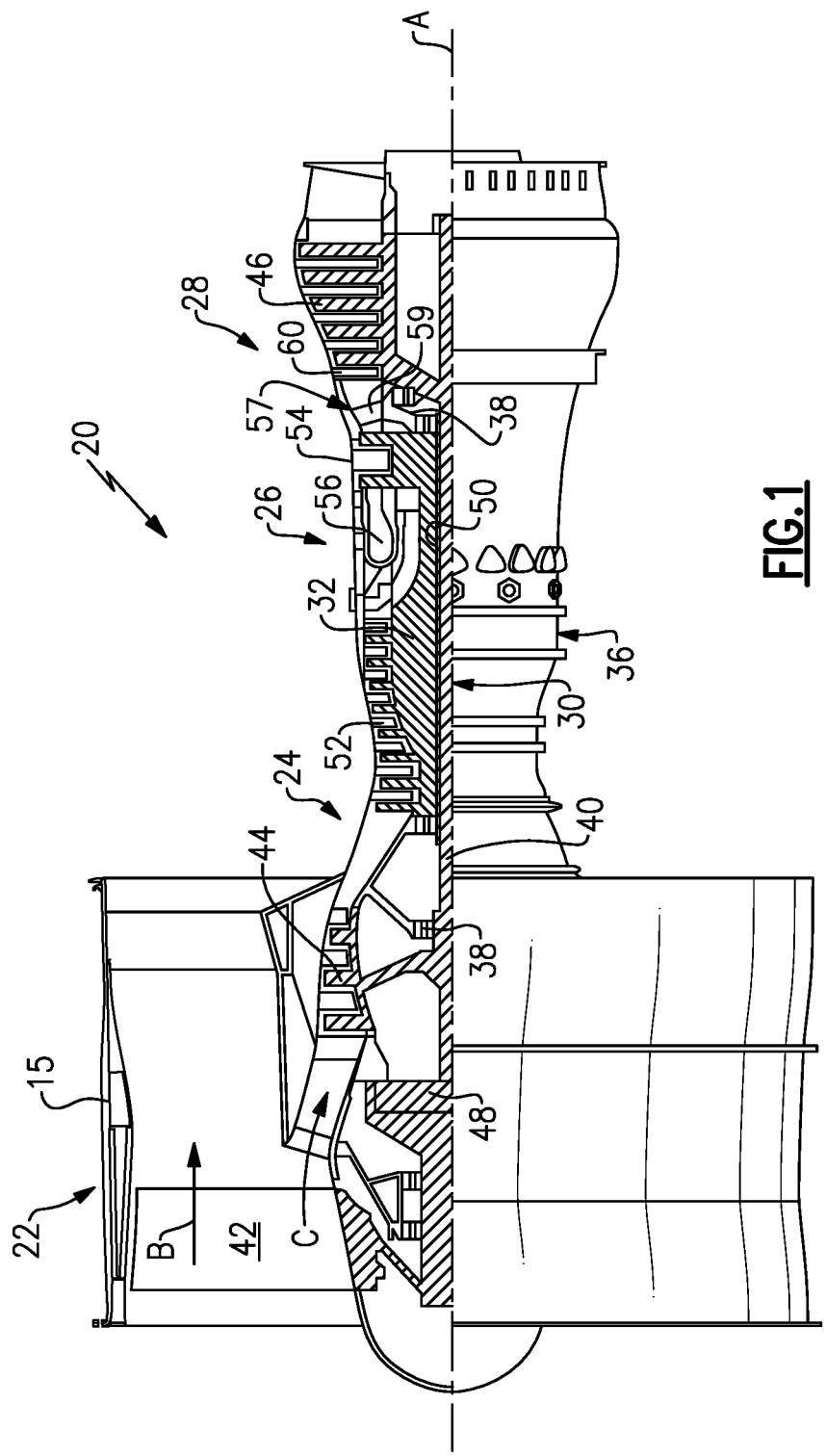
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 meters/second).

Figure 2:
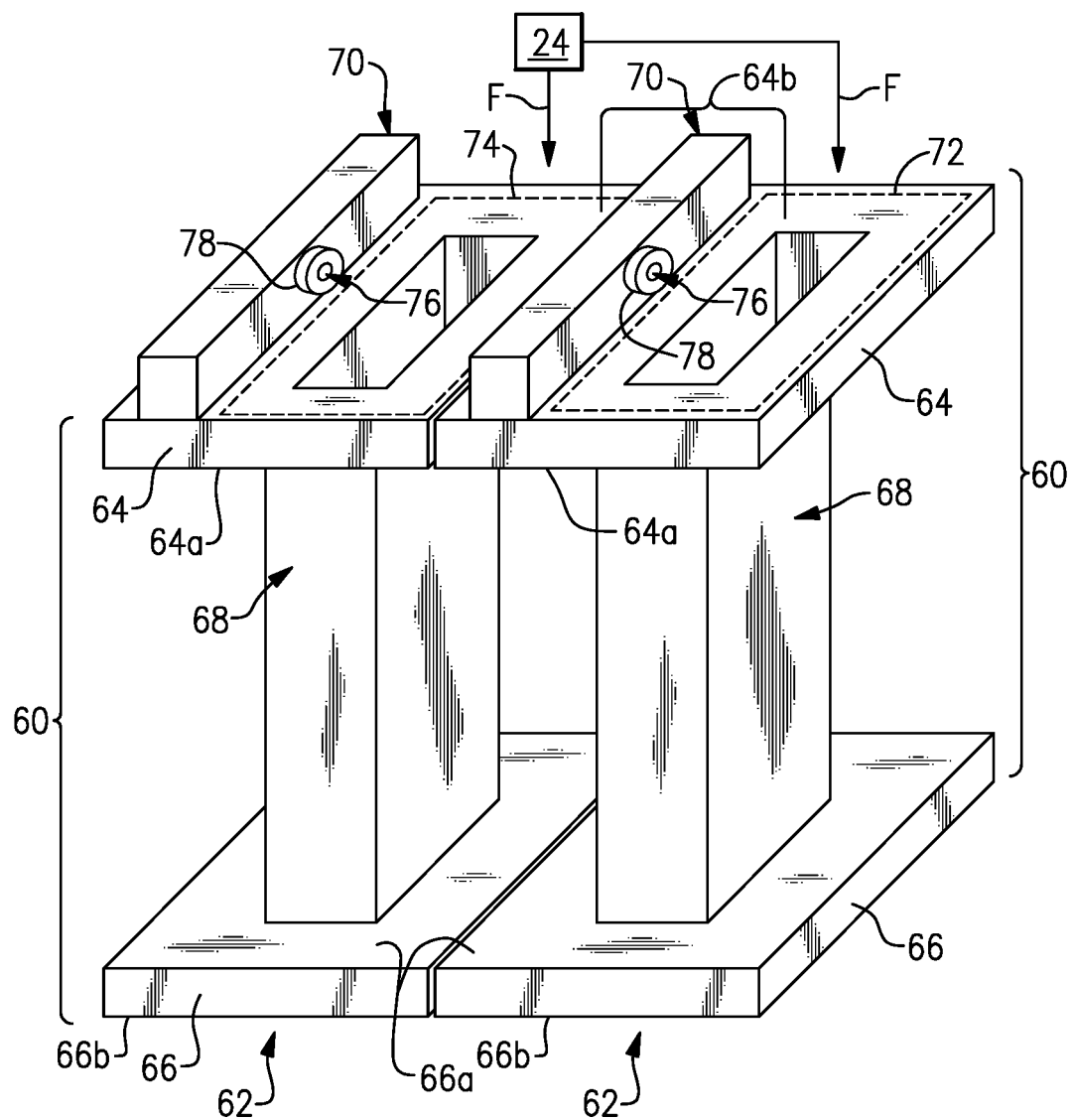
FIG. 2 illustrates gas turbine engine articles, which s shown are vane arc segments.

FIG. 2 illustrates a schematic view of two adjacent gas turbine engine articles 60. In this example, the articles 60 are vane arc segments of a vane ring assembly from the turbine section 28 of the engine 20. It will be appreciated, however, that the examples herein have broader applicability as pointed out in the description below.

In the illustrated example, each article 60 is comprised of a ceramic body 62. The ceramic body 62 in this example includes several sections, including first and second platforms 64/66 and a hollow airfoil section 68 that extends between the first and second platforms 64/66. As will be appreciated, the airfoil sections 68 are shown as highly schematic representations and will actually have an airfoil shape that defines a leading edge, a trailing edge, and pressure and suction sides as are well-known in the field. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

In the illustrated example, the first platform 64 is a radially outer platform and the second platform 66 is a radially inner platform. In that regard, each platform 64/66 has a respective gas path surface 64a/66a that bounds the core gas path and an opposed, non-gas path surface 64b/66b.

A flange 70 projects radially from the non-gas path surface of the first platform 64. The flange 70 partitions first and second cooling passages 72/74 from each other. For example, the flange 70 may be between adjacent vanes, between a vane and an aft blade outer air seal, or between a vane and a case structure. The cooling passages 72/74 are provided with cooling air F, such as bleed air from the compressor section 24 of the engine 20. The cooling air F may be provided into the hollow airfoil section 68 for cooling thereof, passed through the airfoil section 68 for cooling of downstream components, and/or provided to platform edges. In this regard, the cooling passages 72/74 may or may not be of identical configuration and/or purpose.

The pressure between the cooling passages 72/74 differs, at least at times. Such a pressure differential may be undesirable and, in that regard, the flange 70 has one or more through-holes 76 (one is shown, but the flange 70 may have two, three, or four or more such through-holes 76). The through-hole or holes 76 serve as pressure equalizers by permitting cooling air F to flow between the cooling passages 72/74.

The ceramic body 62 is continuous in that the platforms 64/66 and airfoil section 68 constitute a one-piece body. As an example, the ceramic body 62 is formed of a ceramic material, such as a ceramic matrix composite. For instance, the ceramic matrix composite is formed of ceramic fibers that are disposed in a ceramic matrix. The ceramic matrix composite may be, but is not limited to, a SiC/SiC ceramic matrix composite in which SiC fibers are disposed within a SiC matrix. The ceramic fibers are provided in fiber plies. The plies may be woven or unidirectional and may collectively include plies of different fiber weave configurations. One or more of the fiber plies may be continuous through the flange 70 of the first platform 64, through the airfoil section 68, and through to the second platform 66.

In general, ceramic materials have significantly lower thermal conductivity than superalloys and do not possess the same strength and ductility characteristics, making them more susceptible to distress from thermal gradients and the thermally induced stresses those cause. The high strength and toughness of superalloys permits resistance to thermal stresses, whereas ceramics by comparison are more prone to distress from thermal stress. Thermal stresses may cause distress at relatively weak locations in ceramic matrix composites, such as interlaminar interfaces between fiber plies where there are no fibers carrying load. Therefore, although maximized cooling may be desirable for superalloy vanes, cooling in some locations of a ceramic vane may exacerbate thermal gradients and thus be counter-productive to meeting durability goals.

The through-hole 76 is a location that is susceptible to thermal distress. The flow of the cooling air F through the through-hole 76 drives convection heat transfer that, if permitted, will locally cool the flange 70 in at least the immediate vicinity of the through-hole 76. Other portions of the flange 70 that are farther away from the through-hole 76 are in a warmer state. Therefore, if localized cooling in the immediate vicinity of the through-hole 76 is permitted there may be a thermal gradient between the through-hole 76 and other portions of the flange 70 (and/or the platform 64). In order to facilitate a reduction in localized cooling of the through-hole 76, the article 60 includes a thermal insulation bushing 78 that lines the through-hole 76. The bushing 78 thermally shields the localized region of the through-hole 76 from the cooling air flowing there through, thereby helping to maintain this region at a warmer temperature and thus reduce thermal gradients across the flange 70.

Although the flange 70, through-hole 76, and bushing 78 are used on a vane in the illustrated example, the examples of this disclose encompasses other locations and other engine components. In particular, such locations are those in which there is a ceramic flange that is subjected to elevated engine temperatures, and in which the flange has a through-hole that conveys cooling air between passages on opposed sides of the flange. For instance, the flange may be a flange that is inside of the hollow airfoil section 68 as a partition between internal passages, a flange in a blade outer air seal that partitions internal passages, a flange that partitions a portion of the vane from an adjacent structure, or a flange that partitions differential pressure zones on a single vane.

Figure 3A:
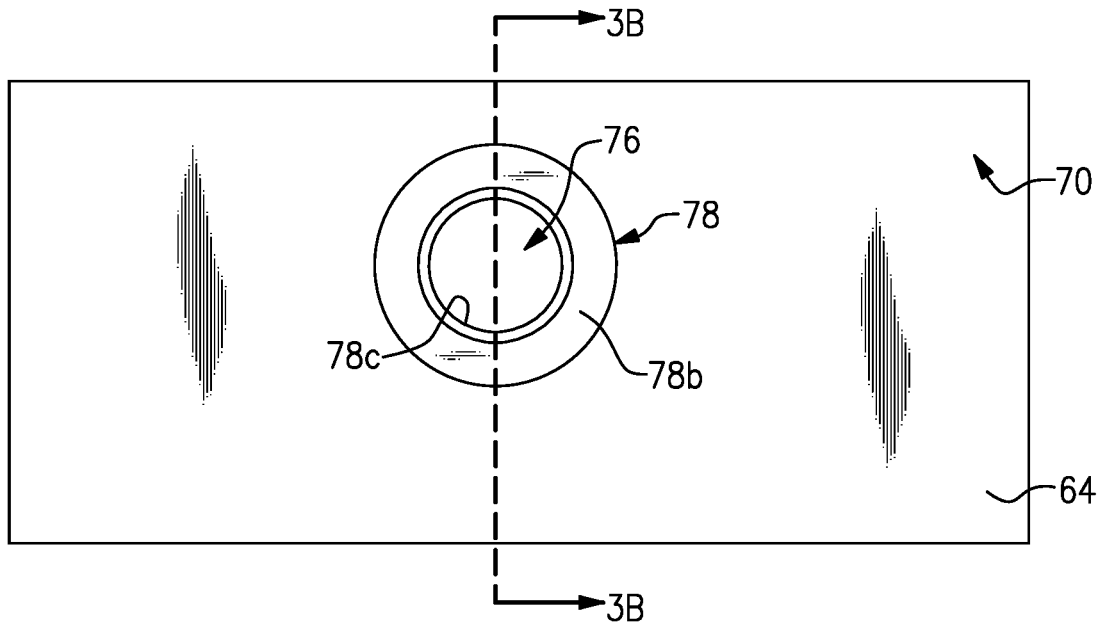
FIG. 3A illustrates an axial view of a through-hole in a ceramic rib of a gas turbine engine article.
Figure 3B:
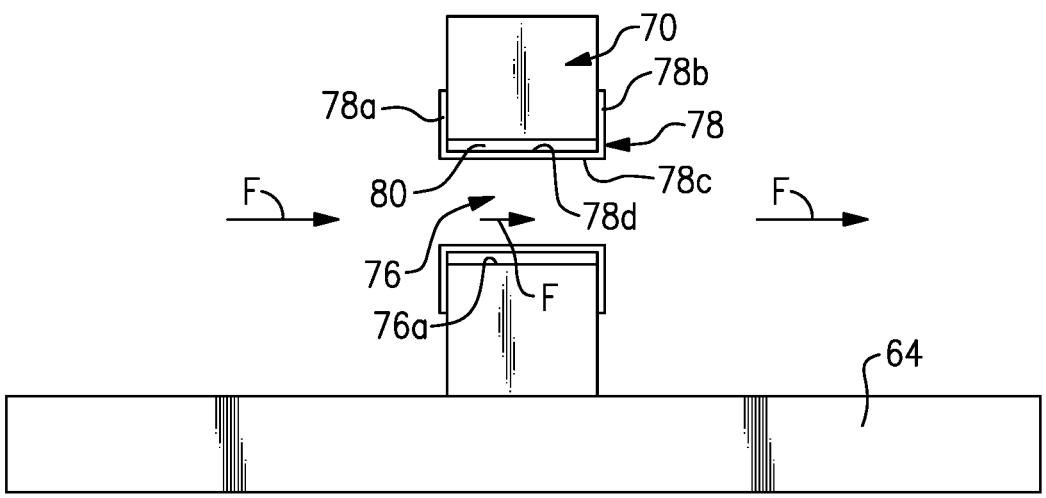
FIG. 3B illustrates a sectioned view through the through-hole of FIG. 3A.
Figure 3C:
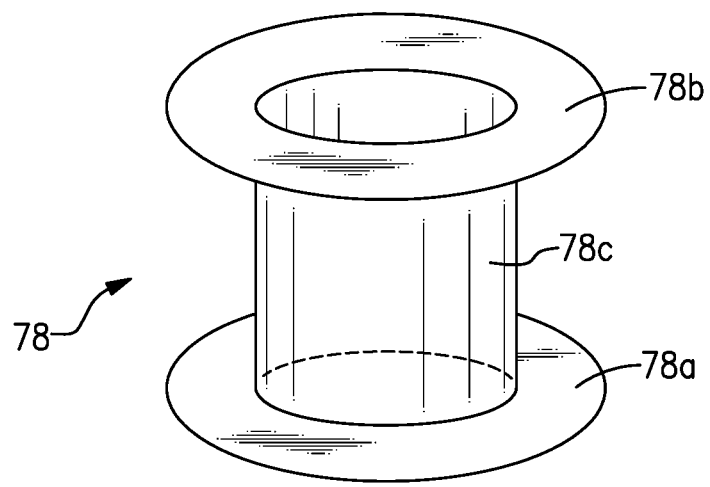
FIG. 3C illustrates an isolated view of a thermal insulation bushing.

FIG. 3A illustrates a view of the through-hole 76 and bushing 78 that is taken along the central axis of the through-hole 76, FIG. 3B illustrates a sectioned view, and FIG. 3C illustrates an isolated view of the bushing 78. In this example, the bushing 78 is a spool that has first and second opposed flanges 78a/78b, with a (hollow) tube 78c that extends there between. In the illustrated example, the flanges 78a/78b are circular in cross-section and the tube 78c is cylindrical, although as will be discussed below the tube 78c may have alternate geometries.

The bushing 78 is formed of a metallic alloy, such as but not limited to, a nickel-based alloy, a cobalt-based alloy, or a single crystal nickel-based alloy. The bushing 78 may also be configured for installation into the through-hole 76. For example, the bushing 78 may initially be provided in two pieces that are inserted from opposite sides into the through-hole 76. The pieces may then be bonded together, such as by welding, or the pieces may inter-fit or have mating connectors that join the pieces together. Alternatively, the bushing 78 may initially be a single piece that is compressed or compacted for insertion into the through-hole 76 and then decompressed or expanded to its final shape and fit.

In one alternative example, the bushing 78 is formed of a ceramic material that is different than the ceramic material from which the flange 70 is formed. For example, the bushing 78 is alumina, silicon carbide, zirconia, or silicon nitride. If the bushing 78 is ceramic, it may be initially provided in two pieces for insertion into the through-hole 76 as discussed above.

The flanges 78a/78b of the bushing 78 bear against the sides of the flange 70 of the platform 64 and may secure the bushing 78 in place by tension fit, friction fit, or both. If a tighter fit is desired, the bushing 78 may also be bonded to the sides of the flange 70. The tube 78c is of smaller diametric size than the through-hole 76 such that there is a gap 80 between the outer surface 78d of the tube 78c and the sides 76a of the through-hole 76. The tube 78c is thus in non-contact with the flange 70 (i.e., the tube 78c does not contact the ceramic body 62).

The tube 78c acts as a barrier to convective flow of the cooling air over the sides of the through-hole 76. The gap 80 serves as an insulation space to facilitate thermal shielding of the flange 70 from the cooling air passing through the through-hole 76. Furthermore, as the only contact between the bushing 78 and the flange 70 is the area of the flanges 78a/78b that bears against the sides of the flange 70, thermal conductance is also minimized. The bushing 78 thus provides a triple thermal barrier—as a convection barrier, an insulation barrier, and a conductance barrier.

Figure 4:
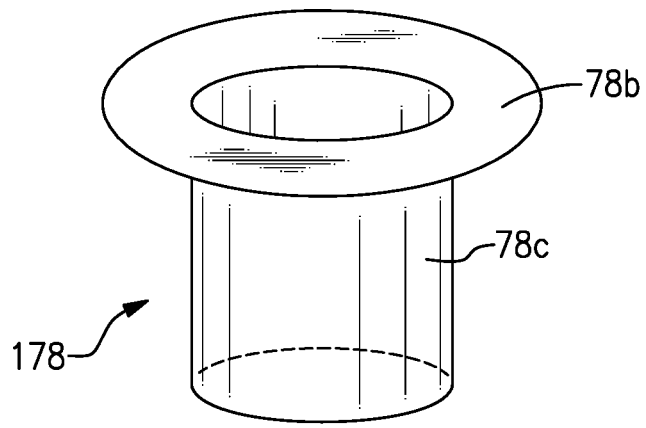
FIG. 4 illustrates another example thermal insulation bushing.

The bushing 78 is not limited to the particular geometry shown. For example, FIG. 4 illustrates another example bushing 178 that can be used. In this example, the bushing 178 is a single-ended spool having a single flange 78b and the tube 78c extending therefrom. In the through-hole 76, the flange 78b will be on the higher-pressure side of the flange 70 such that cooling air generally flow into the end of the tube 78c that has the flange 78b. The flange 78b limits that amount of cooling air that flows into the gap 80. Some cooling air may backflow into the gap 80 from the lower-pressure side of the flange 70 at the end of the tube 78c that does not have a flange, but this is of less concern for convection cooling than the faster flowing air that flows through the tube 78c.

Figure 5A:
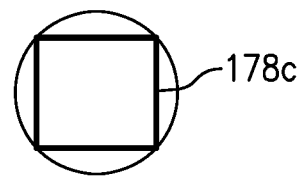
FIG. 5A illustrates a square tube of a thermal insulation bushing.
Figure 5B:
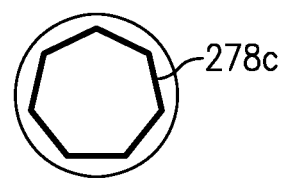
FIG. 5B illustrates a hexagonal tube of a thermal insulation bushing.
Figure 5C:
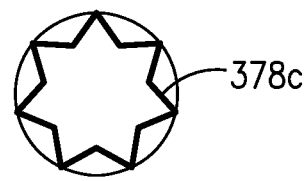
FIG. 5C illustrates a star-shaped tube of a thermal insulation bushing.

As indicated above, the tube 78c is cylindrical. Alternatively, the tube 78c can have a polygonal cross-sectional geometry. FIGS. 5A, 5B, and 5C illustrate sectioned views of additional non-limiting examples. In FIG. 5A, the tube 178c has a square cross-section; in FIG. 5B the tube 278c has a hexagonal cross-section; and in FIG. 5C the tube 378c has a star-shaped cross-section. Each of the tubes 178c/278c/378c may have a flange or flanges 78a/78b/178b as discussed above and may be used in a circular through-hole 76.

Figure 6:
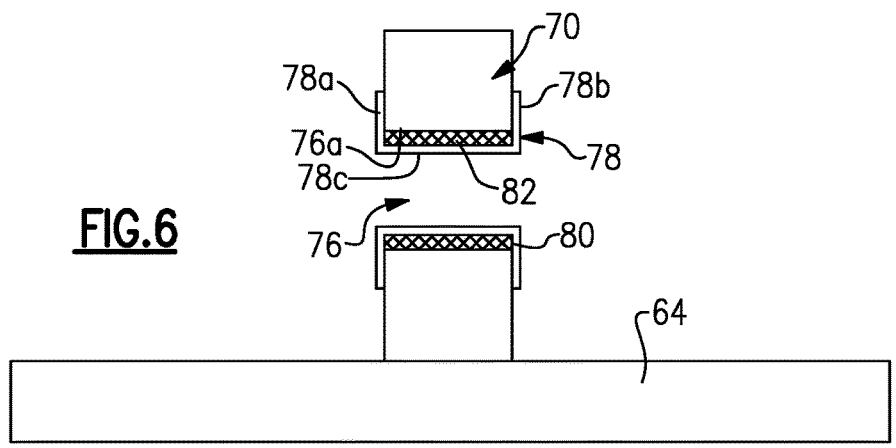
FIG. 6 illustrates another example in which there is a thermal insulation sleeve between a bushing and a through-hole.

FIG. 6 illustrates another example that is the same as the example in FIG. 3B except that there is an insulation sleeve 82 around the bushing 78 in the gap 80 between the tube 78c and the sides 76a of the through-hole 76. The insulation sleeve 82 provides additional insulation of the flange 70 and may also facilitate manufacturing if a desired gap 80 cannot be incorporated. For example, the insulation sleeve 82 is a fabric sleeve that is formed of ceramic fibers, such as but not limited to, aluminoborosilicate, aluminosilicate, alumina, and combinations thereof. In one example, the ceramic fibers are formed of NEXTEL fibers by 3M Company Corporation of Delaware. It is to be appreciated that in further examples, the insulation sleeve 82 is provided between the bushing and the through-hole of each of the examples herein.

Figure 7A:
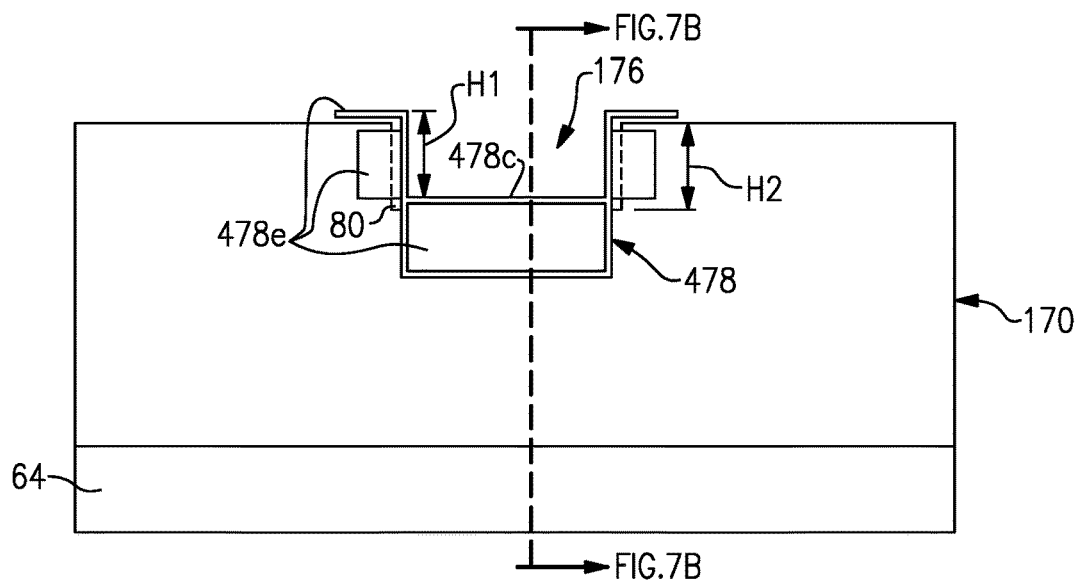
FIG. 7A illustrates another example of a thermal insulation bushing that has foldable tabs.
Figure 7B:
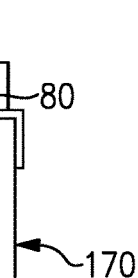
FIG. 7B illustrates a sectioned view of FIG. 7A.

FIG. 7A illustrates another example, in which the through-hole 176 is a castellated hole at the top edge of the flange 170. FIG. 7B illustrates a sectioned view through FIG. 7A. In this example, bushing 478 is scalloped such that it has foldable tabs 478e. The foldable tabs 478e extend off of central tube portion 478c that lines the through-hole 176. The foldable tabs 478e at the ends of the bushing 478 fold against the side faces of the flange 170 to retain the bushing along the flow direction. The foldable tabs 478e along the central tube portion 478c fold toward the top face of the flange 170 to limit movement of the bushing 478 in the direction perpendicular to the flow direction through the through-hole 176. The foldable tabs 478e along the central tube portion 478c also establish a height H1 if the bushing 478 to be less than the height H2 of the through-hole 176. Thus, when the foldable tabs 478e along the central tube portion 478c contact the top of the flange 170 they act as stops such that the bushing 478 doe snot bottom out in the through-hole 176 in order to maintain the gap 80.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
   a ceramic body defining a flange;
   first and second cooling passages partitioned from each other by the flange;
   a through-hole in the flange connecting the first and second cooling passages; and
   a thermal insulation bushing lining the through-hole, the thermal insulation bushing is a spool that has first and second opposed flanges with a tube extending there between, and the tube is in non-contact with the ceramic body.

2. The gas turbine engine article as recited in claim 1, wherein the tube is cylindrical.

3. The gas turbine engine article as recited in claim 1, wherein the tube has a polygonal cross-section.

4. The gas turbine engine article as recited in claim 1, wherein the tube defines an outer surface and the through-hole has hole sides, and there is a gap between the outer surface and the hole sides.

5. The gas turbine engine article as recited in claim 4, further comprising a thermal insulation sleeve in the gap.

6. The gas turbine engine article as recited in claim 1, wherein the first and second flanges contact the ceramic body.

7. The gas turbine engine article as recited in claim 1, wherein the thermal insulation bushing has foldable tabs.

8. The gas turbine engine article as recited in claim 1, wherein the thermal insulation bushing is metallic.

9. The gas turbine engine article as recited in claim 1, wherein the thermal insulation bushing is ceramic.

10. A gas turbine engine article comprising:
    a ceramic matrix composite airfoil body defining first and second platforms and an airfoil section extending between the first and second platforms, the first platform defining a radially inner side, a radially outer side, and a flange projecting from the radially outer side;
    first and second cooling passages partitioned from each other by the flange;
    a through-hole in the flange connecting the first and second cooling passages; and
    a thermal insulation bushing lining the through-hole, the thermal insulation bushing is a spool that has first and second opposed flanges with a tube extending there between, the tube defines an outer surface, the through-hole has hole sides, there is a gap between the outer surface and the hole sides, and the first and second flanges contact the ceramic body.

11. A gas turbine engine comprising:
    a compressor section;
    a combustor in fluid communication with the compressor section; and
    a turbine section in fluid communication with the combustor, the turbine section having vanes disposed about a central axis of the gas turbine engine, each of the vanes includes:
    a ceramic matrix composite airfoil body defining first and second platforms and an airfoil section extending between the first and second platforms, the first platform defining a radially inner side, a radially outer side, and a flange projecting from the radially outer side, first and second cooling passages partitioned from each other by the flange, the compressor section providing cooling air to the first cooling passage that is at a first pressure and to the second cooling passage that is at a second, different pressure, a through-hole in the flange connecting the first and second cooling passages, the cooling air flowing through the through-hole, and a bushing lining the through-hole and thermally insulating the flange from being cooled by the cooling air flowing through the through-hole.

12. The gas turbine engine as recited in claim 11, wherein the thermal insulation bushing is a metallic spool that has first and second opposed flanges with a tube extending there between, the tube defines an outer surface, the through-hole has hole sides, and there is a gap between the outer surface and the hole sides.

13. The gas turbine engine as recited in claim 12, wherein the first and second flanges contact the ceramic body.

14. The gas turbine engine article as recited in claim 11, wherein the thermal insulation bushing is a single-ended spool having a single flange and a tube extending therefrom.

* * * * *